(12) United States Patent
Soderberg et al.

(10) Patent No.: US 7,506,204 B2
(45) Date of Patent: Mar. 17, 2009

(54) DEDICATED CONNECTION TO A DATABASE SERVER FOR ALTERNATIVE FAILURE RECOVERY

(75) Inventors: Joel Mathew Soderberg, Edmonds, WA (US); Miroslaw H. Sztajno, Woodinville, WA (US); Sameer A. Tejani, Newcastle, WA (US); Sharad Sundaresan, Sammamish, WA (US); James Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 11/114,303

(22) Filed: Apr. 25, 2005

(65) Prior Publication Data

US 2006/0248034 A1 Nov. 2, 2006

(51) Int. Cl.
*G06F 11/00* (2006.01)

(52) U.S. Cl. ....................................................... 714/27
(58) Field of Classification Search ..................... 714/27
See application file for complete search history.

(56) References Cited

U.S. PATENT DOCUMENTS

| | | | | |
|---|---|---|---|---|
| 6,260,160 B1* | 7/2001 | Beyda et al. | .................. | 714/27 |
| 6,347,340 B1* | 2/2002 | Coelho et al. | ................ | 709/246 |
| 6,721,763 B1* | 4/2004 | Pekowski et al. | ........ | 707/104.1 |
| 6,895,532 B2* | 5/2005 | Raynham | ..................... | 714/46 |
| 7,181,474 B2* | 2/2007 | Asherman | ................... | 707/202 |
| 7,194,543 B2* | 3/2007 | Robertson et al. | ........... | 709/226 |
| 7,266,722 B2* | 9/2007 | Kingsbury | .................... | 714/15 |
| 7,269,761 B2* | 9/2007 | Yi | ................................ | 714/46 |
| 7,293,201 B2* | 11/2007 | Ansari | ......................... | 714/38 |
| 2001/0020251 A1* | 9/2001 | Sheikh et al. | ............... | 709/224 |
| 2001/0034732 A1* | 10/2001 | Vorholt et al. | ................ | 707/10 |
| 2001/0054161 A1* | 12/2001 | Wooddruff | .................... | 714/27 |
| 2002/0042896 A1* | 4/2002 | Johnson et al. | ............... | 714/47 |
| 2002/0161814 A1* | 10/2002 | Wical | ......................... | 709/101 |
| 2003/0005362 A1* | 1/2003 | Miller et al. | .................. | 714/27 |
| 2004/0158474 A1* | 8/2004 | Karschnia et al. | ............. | 705/1 |
| 2004/0221163 A1* | 11/2004 | Jorgensen et al. | ........... | 713/182 |
| 2004/0250098 A1* | 12/2004 | Licis | .......................... | 713/193 |
| 2005/0049973 A1* | 3/2005 | Read et al. | .................... | 705/59 |
| 2005/0111363 A1* | 5/2005 | Snelgrove et al. | ........... | 370/230 |
| 2005/0235007 A1* | 10/2005 | Abali et al. | .................. | 707/202 |
| 2006/0015764 A1* | 1/2006 | Ocko et al. | .................... | 714/4 |
| 2006/0075301 A1* | 4/2006 | Fossum et al. | ................ | 714/38 |
| 2006/0085669 A1* | 4/2006 | Rostron et al. | ................. | 714/4 |
| 2006/0130141 A1* | 6/2006 | Kramer et al. | ................ | 726/23 |
| 2006/0248034 A1* | 11/2006 | Soderberg et al. | .............. | 707/1 |

* cited by examiner

*Primary Examiner*—Robert Beausoliel
*Assistant Examiner*—Amine Riad
(74) *Attorney, Agent, or Firm*—Woodcock Washburn LLP

(57) ABSTRACT

A Dedicated Administrator Connection (DAC) for a database server is provided that allows a user with administrator privileges to connect to the database server when a connection by standard means fails. By allowing an administrator to connect to the server through the DAC, the administrator can resolve the issue despite the failure and bring back the server to a responsive state without requiring the server to be shut down and restarted. Additionally, support engineers, developers, etc. can use the DAC to diagnose a range of problems without the use of a debugger or requesting a repro while monitoring for issues.

16 Claims, 8 Drawing Sheets

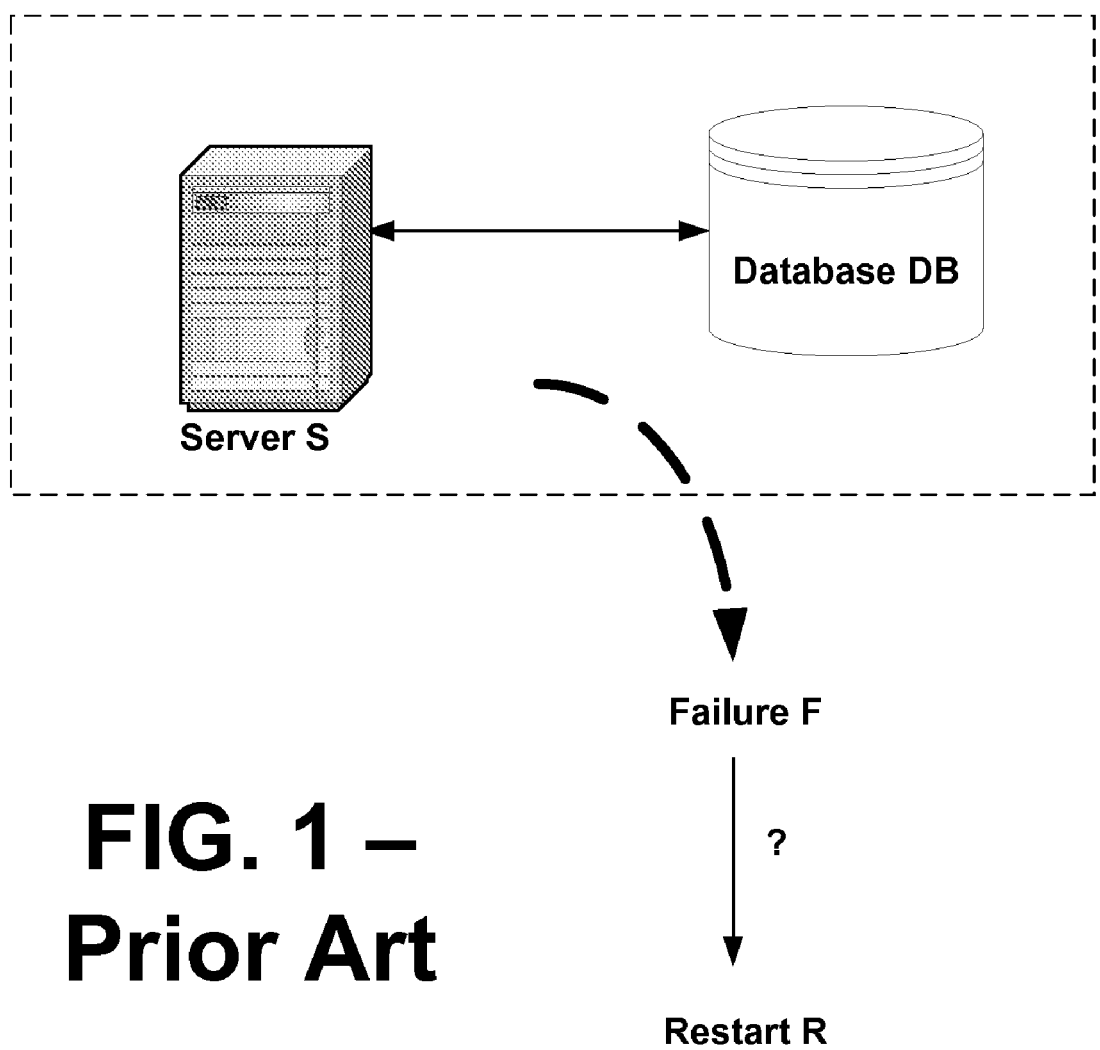
FIG. 1 – Prior Art

DEDICATED CONNECTION TO A DATABASE SERVER FOR ALTERNATIVE FAILURE RECOVERY

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2002-2005, Microsoft Corp.

FIELD OF THE INVENTION

The present invention relates to recovering from failure when a database server becomes non-responsive. More particularly, the invention relates to a dedicated connection of a database server that can be used when the database server enters a non-responsive state, and that also can be used to test or monitor operation of the database server.

BACKGROUND OF THE INVENTION

Standard operation of a database server might fail, for instance, when the database server is in a non-responsive state, such as a hung state, e.g., caused by bad application design, bad configuration, a bug in the server code, etc. As a last resort measure to a system crash, database server products tend to offer various recovery models for each database to restore a previous state of the system upon rebooting the machine. For example, some servers offer full recovery, simple recovery and bulk-logged recovery. The various recovery models determine how much data loss is acceptable in case of a failure and what types of backup and restore functions are allowed.

For instance, the simple recovery model allows the recovery of data only to the most recent full database or differential backup. The full recovery model uses database backups and transaction log backups to provide complete protection against failure. Along with being able to restore a full or differential backup, the database can be restored to the point of failure or to a specific point in time. The bulk-logged recovery model provides protection against failure combined with the best performance by minimally logging a subset of operations. In such a case, the data is not fully recoverable and the database can only be recovered to the end of a transaction log backup when the log backup contains bulk changes.

However, recovery from failure from any of these or other techniques, or combinations thereof, currently is very expensive in terms of time and resources because each of the techniques involves restarting the machine and/or "rewinding" and "replaying" of system operations to return to the recovered state. Some business applications are time critical and/or involve massive amounts of data, such that these recovery techniques, which typically require rebooting the machine, are unacceptably tedious and slow.

Thus, as generally illustrated in FIG. 1, with current database servers, when the server S in communication with database DB fails for some reason F, oftentimes, the only recourse is to shut down and restart the machine R. Depending upon the applications that are currently executing, and depending on the server S, this can be a very costly step in terms of customer relations, time and quality of service. Current database servers do not allow access to a database server when it is executing in an abnormal state, or otherwise not responding via ordinary server connections, making it very difficult to troubleshoot, diagnose, or obtain any run-time information from an "ill" behaving database server.

Thus, it would be desirable to have a separate, dedicated, connection which would allow privileged access to the server when such failure conditions manifest. It would be further desirable to use such dedicated connection to check/resolve the current status of the server and/or to gather any data that product support services (PSS) members could use to troubleshoot the problem in case the problem cannot be resolved internally by an information technology (IT) administrator or other person with privileged access to the machine. It would be further desirable to have the ability to terminate some "non-responding server" problems, such as a "runaway transaction," by terminating the given system process identification (SPID) that belongs to the runaway transaction using such a dedicated connection. In sum, there is a need in the art for a way to diagnose a server in a failed state in order to resolve certain situations to bring the server back online, without rebooting the machine.

SUMMARY OF THE INVENTION

In view of the foregoing, the present invention provides systems and methods enabling a Dedicated Administrator Connection (DAC) for a database server that allows a user with administrator privileges to connect to the database server when a connection by standard means fails. By allowing an administrator to connect to the server through the DAC, the administrator can resolve the issue despite the failure and bring back the server to a responsive state without requiring the server to be shut down and restarted. Additionally, support engineers, developers, etc. can use the DAC to diagnose a range of problems without the use of a debugger or requesting a repro while monitoring for issues.

Other features of the present invention are described below.

BRIEF DESCRIPTION OF THE DRAWINGS

The system and methods enabling a DAC in accordance with the invention are further described with reference to the accompanying drawings in which:

FIG. 1 is a block diagram illustrating an exemplary prior art failure and restart scenario addressed in accordance with the present invention;

DETAILED DESCRIPTION OF ILLUSTRATIVE EMBODIMENTS

Overview

Figure 2A:
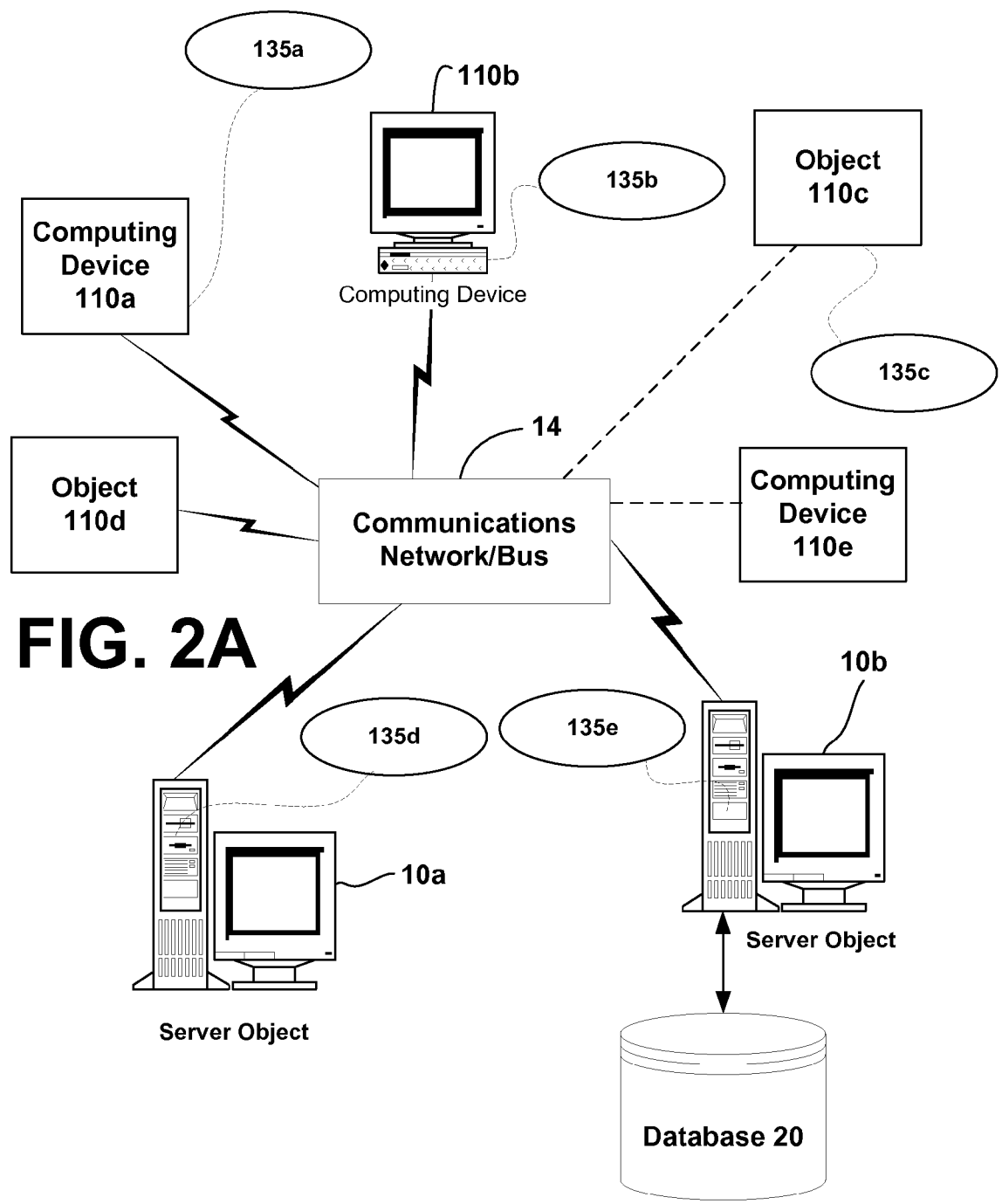
FIG. 2A is a block diagram representing an exemplary network environment in which the present invention may be implemented.

As mentioned, the invention provides a Dedicated Administrator Connection (DAC) for a database server, such as SQL server, that allows a user with administrator privileges to connect to the server when a connection by standard means fails. Standard operation might fail, for instance, from the server being in a hung, or other non-responsive, state, e.g., caused by bad application design, bad configuration, a bug in the server code, etc. By allowing an administrator to connect to the server through this connection, the administrator can resolve the issue despite the failure and bring back the server to a responsive state without requiring the server to be shut down and restarted. Furthermore, the invention allows support engineers, developers, etc. to diagnose a range of problems without the use of a debugger or requesting "a repro" (i.e., bug capture technology for optimized bug capture, communication and reproduction) while monitoring for issues.

On startup, database servers, such as SQL Server, allocate resources such as memory, threads, network ports to which the server will listen, etc. These resources are used during the regular execution of commands from different connections. In accordance with the invention, to enable a connection through the dedicated administrator connection (DAC), the server reserves some of these resources exclusively for use by this connection. In one embodiment, a pre-defined amount of memory, a few threads and a dedicated listener port are assigned, or reserved, for the DAC. When the administrator wants to makes use of this connection, the administrator initiates a request to connect to the assigned network port to which the assigned threads are listening. The request is then processed by the assigned threads.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the DAC in accordance with the present invention. The present invention may apply to an environment with server computers and client computers deployed in a network environment or distributed computing environment, having remote or local storage.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate use of the DAC of the invention.

FIG. 2A provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, suitable for requesting use of the DAC in accordance with the invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the DAC according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which may be utilized in connection with a database server in accordance with the processes of the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 2A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the DAC in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to utilization of the DAC of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to provide a DAC in accordance with the invention.

In a network environment in which the communications network/bus 14 is the Internet, for example, the servers 10a, 10b, etc. can be Web servers with which the clients 10a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 2B:
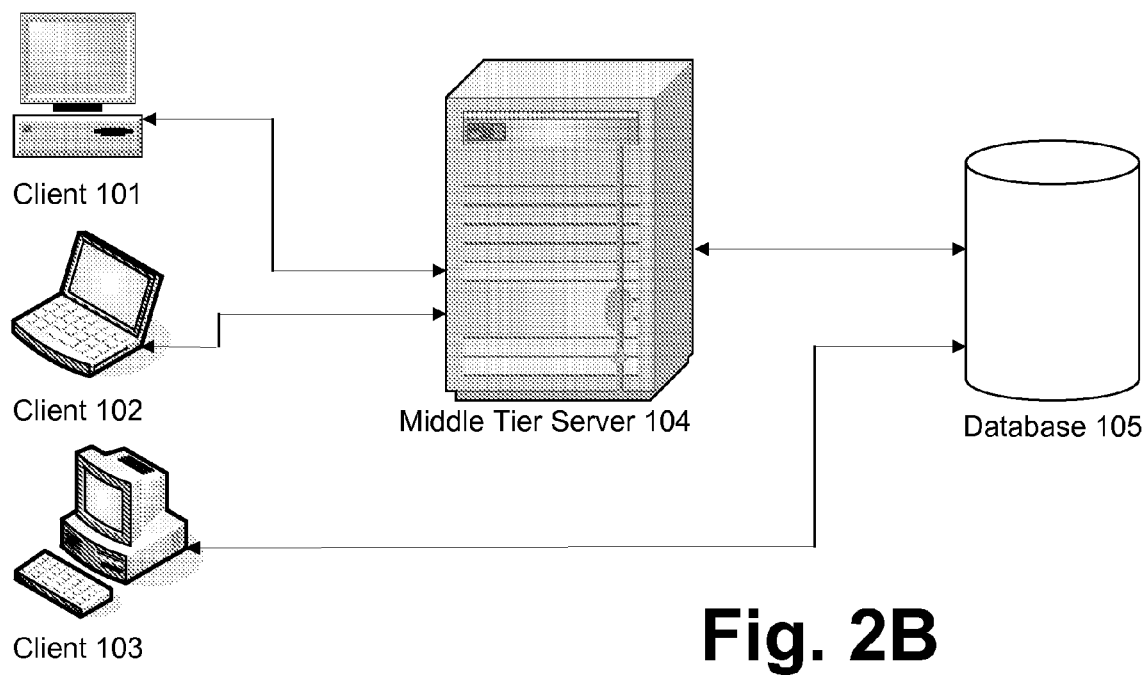
FIG. 2B shows an exemplary database that is communicatively coupled to client devices and a middle-tier server, illustrating an exemplary non-limiting environment in which the present invention may be implemented.

Referring to FIG. 2B, the systems and methods of the invention can be implemented in an environment in which one ore more clients 101, 102, and 103 access a database 105. Clients 101, 102, and 103 may access database 105 through one or more middle-tier servers such as 104, or may access the database 105 directly, as illustrated with respect to client 103. An API that implements aspects of the invention could execute operations on a client, e.g., 101, 102, or 103, a server 104, or database 105. In a distributed computing arrangement, software functionality such as an API can actually execute on a number of cooperating devices. Thus, the API provided herein can execute on any of the devices illustrated in FIG. 2B, or on any combination of those devices working in unison.

Figure 2C:
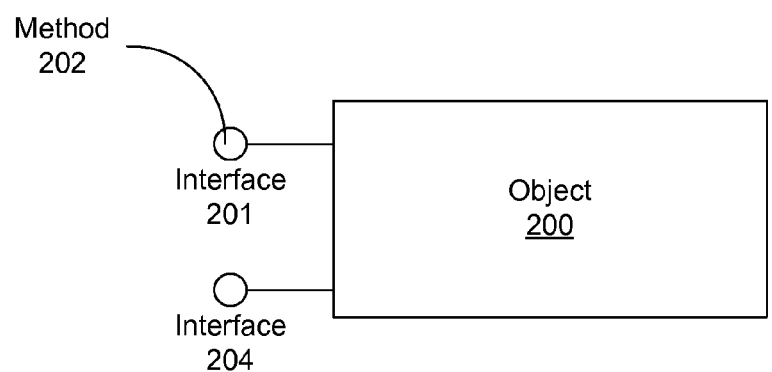
FIG. 2C illustrates an object with interfaces and methods, further illustrating an exemplary non-limiting database server environment in which the present invention may be implemented.

A database 105 is a collection of data, typically describing the activities of one or more related organizations. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server"

refers to either or both of a collection of data and DBMS software. Thus, database 105 in FIG. 2B, and 202 in FIG. 2C illustrate database servers comprising both collections of data and DBMS. Further distinction may be made where illustrative.

Many kinds of databases are in use. The first database model is widely attributed to Charles Bachman of General Electric in the early 1960's. This was called the Integrated Data Store, and followed the network data model. Later in the 1960's, IBM developed the Information Management System, which formed the basis for a hierarchical data model. In 1970, Edgar Codd of IBM proposed the relational data model, which proved to be a watershed in the development of database systems. The popularity of relational databases changed the commercial landscape. Their benefits were widely recognized, and the use of databases for managing corporate data became standard practice. While relational databases are the dominant model in use today, the various aspects of the invention are suitable for use in connection with any database presently in use or later developed that is capable of storing data of a plurality of data types. As described in the background section, this is particularly advantageous in the context of object-oriented data storage.

Various DBMS products, e.g., MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Databases have entered the internet age. The use of a database to store data accessed through a web browser is widespread. Queries are generated through Web-accessible forms and answers are formatted using a markup language such as Hyper Text Markup Language (HTML) or Extensible Markup Language (XML) which can be displayed in a browser. Databases continue to gain importance as more and more data is brought online and made ever more accessible through computer networking. Today the field is being driven by exciting visions such as multimedia databases, interactive video, streaming data, digital libraries, a host of scientific projects, and corporate data consolidation and data mining. Where access to databases over global computer networks is commonplace, it should be clear that the systems and methods provided herein can be used regardless of the distance or type of connection between a client 101, 102, 103 and a database 105.

Database 105 may contain data of any kind, and may contain both data types that are operable with the invention, by conforming to the broader type-system described herein, and data types that may not conform to such a type system and which are not operable with the invention. Database 105 may contain, for example, bank account data, songs, a book catalogue, electronic books, scientific information, archived weather and oceanographic information. The data that may be stored on database 105 is as diverse as the scope of human interests. Any such data may conform to a data type. A data type may range from standard types, such as strings and integers, to custom user-defined types that are used only by a specialized group of users.

When a middle-tier server 104 is used to process client 101, 102 requests, the arrangement is known in the industry as a three-tier system—therefore server 104 is referred to in FIG. 2B as a middle tier server 104. The middle tier server 104 is an intermediary between client computers 101, 102, and 103 and database 105. In today's network environments, the number of client 101, 102, and 103 requests that require database services may be at one time very small, and at another time enormous. Thus, it is desirable to design a system such as that of FIG. 2B to be highly scalable, allowing the system to fluctuate efficiently between few and many client 101, 102, and 103 demands. A middle-tier server can assist in scalability of a database service.

A computing device such as 101, 102, 103, 104, and 105 typically includes at least some form of computer readable media. Computer readable media can be any available media that can be accessed by a computing device. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring to FIG. 2C, the API provided herein may be embodied as one or more objects 200. Object 200 is a discrete unit of software typically generated using object-oriented programming techniques. There are several different types of objects, depending on the particular programming technique that is used, and the API provided here may be implemented using any such technique. COM objects typically support multiple interfaces 201, 204, but other object types are available and widely used in the industry, and the object 200 described here is intended as a nonlimiting example for the purpose of illustration.

Objects such as 200 generally support one or more interfaces 201, 204, each of which may include methods. A method 202 is typically a function or a procedure that performs a specific action and can be called by software, e.g., another object which may form part of a client process. Such software is referred to as the client of object 200. Thus, the term client, as that term is used here, does not necessarily refer to a complete device, but rather refers to an entity that makes a request of another entity.

The methods 202 that make up an interface 201 are usually related to each other in some way. In general, clients can access the services provided by an object 200 by invoking the methods 202 in the object's interfaces 201, 204. Clients are generally prohibited from accessing an object's data. It should be noted that functions described herein and in the claims as accomplished by an object 200 may also be achieved through multiple objects designed to interface with each other.

Typically, an object 200 is an instance of a specific class. One class, for example, might contain objects that provide services for opening a connection to a database server, while another class might contain objects for writing data to a file. Typically, a programmer knows an object's class prior to running an instance of that object.

The class of an object is looked up in a class library (not shown). Such a class library has access to a directory of all available classes of objects. A client can call a function in a library specifying the class of object it wants and the first supported interface to which it wants a pointer. The library then causes a server that implements an object of that class to start running. The library also passes back to the initiating client a pointer to the requested interface on the newly instantiated object. The client can then ask the object directly for pointers to any other interfaces the object supports.

Interfaces supported by objects are generally thought of as a contract between the object and its clients. The object promises to support the interface's methods as the interface defines them, and the clients promise to invoke the methods correctly. Thus, an object and the clients must agree on a way to explicitly identify each interface, a common way to describe, or define, the methods in an interface, and a concrete definition of how to implement an interface.

Thus, objects can be described in terms of the interface parameters that they inherit, as well as the class parameters that they inherit. Where a class of objects has a function for writing data to a file, for example, an instance that inherits the class will also be able to write data to a file, as well as any additional features and functions provided in the instance. Where a class supports a particular interface, an instance of the class inherits the "contract" and therefore also supports the interface.

The objects through which aspects of the invention are implemented generally conform to these programming principles and understandings of the definitions for objects, classes, and interfaces. However, it should be clear that modifications and improvements to object-oriented programming techniques are constantly occurring, and the invention is not limited to objects of a particular type or with any specific features. The API provided can be implemented through objects of any kind now in use or later developed.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the DAC in accordance with the invention may be included in, supported in or accessed via all of the languages and services enabled by managed code, such as .NET code, and in other distributed computing frameworks as well.

Dedicated Administrative Connection for a Database Server

The invention provides a Dedicated Administrator Connection (DAC) for a database server, such as SQL server, that allows a user with administrator privileges to connect to the server when a connection by standard means fails. The administrator can thus resolve various issues despite server failure, bringing back the server to a responsive state without requiring the server to be shut down and restarted. Furthermore, support engineers, developers, etc. can diagnose a range of problems without the use of a debugger or bug capture, communication and reproduction software while monitoring for issues. The DAC thus allows independent access to a database server to execute a set of diagnostic functions, or well defined server language statements, such as SQL statements, in case the database server is in an abnormal state or otherwise not responding normally via a regular session connection.

In general, a database server, such as SQL Server, allocates resources on startup, such as memory, threads, network ports to which the server will listen, etc. These resources are then used during the regular execution of commands from the various different connections to the database server. In accordance with the invention, to enable a connection through the DAC, the server reserves some of these resources exclusively for use by the DAC. In one embodiment, a pre-defined amount of memory, a pre-defined number of threads and a dedicated listener port are assigned only to the DAC. When the administrator wants to makes use of the DAC, the administrator initiates a request to connect to the assigned network port to which the assigned threads are listening. The request is then processed by the assigned threads.

The scope and the functionality of the DAC is described in exemplary, non-limiting embodiments in connection with a SQL Server implementation, however, one of ordinary skill in the art can appreciate that the invention may be implemented in any database server where the costs of restarting the machine can be high.

As mentioned in the background, current database servers and associated operating software do not allow accessing the database server when it is running in an abnormal state, i.e., not responding via a regular SQL Server connection, making it very difficult to troubleshoot, diagnose, or obtain any runtime information from the "ill" behaving database server.

Accordingly, the invention introduces a separate, dedicated, connection for an administrator that allows the database administrator (DBA) to access the server, and to check/ resolve its current status as well as gather any data that can be used to troubleshoot the problem by professionals in case it cannot be resolved by the DBA. Thus, some common "non-responding server" problems, such as "a runaway transaction," can be solved by terminating the given system process identifier (SPID) that belongs to the runaway transaction using the DAC. While some of the implementation specific details described below refer to SQL Server as a server using SQL statements for communication therewith, it should be eminently clear that the DAC of the invention can be provided in connection with any database server architecture and language.

Figure 3A:
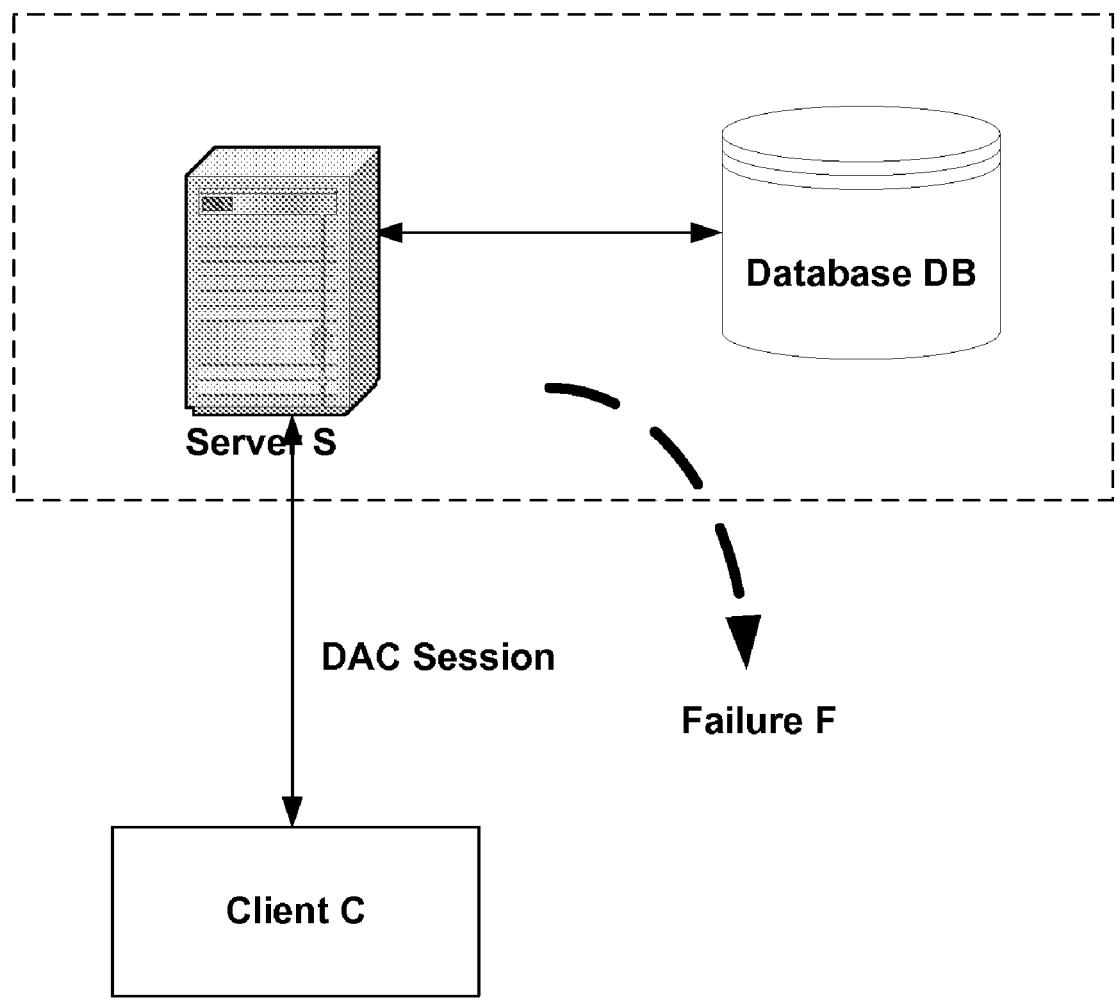
FIG. 3A is a block diagram illustrating general applicability of the DAC in accordance with the invention.

Thus, as illustrated in FIG. 3A, instead of restarting the computer to fix a failure F, a user with administrator privileges creates a DAC session and connects to the DAC of server S from client C, diagnoses and identifies the source of failure F, e.g., the offending SPID, and then explicitly terminates the offending SPID, thereby restoring operation of server S. The DAC session may then be terminated.

The invention may also be implemented in a system employing a NUMA (non-uniform memory access) architecture. NUMA is a method of configuring cluster(s) of microprocessors in a multiprocessing system so that they can share memory locally, improving performance and the ability of the system to be expanded. NUMA can be used in a symmetric multiprocessing (SMP) system to add an intermediate level of memory shared among a few microprocessors so that all data accesses don't have to travel on the main bus.

NUMA can be thought of as a "bucket" or "cluster in a box," typically including four microprocessors interconnected on a local bus to shared memory on a single motherboard, or card. This unit can be added to similar units to form a symmetric multiprocessing system in which a common SMP bus interconnects all of the clusters. Such a system can typically include from 16 to 256 microprocessors. In this regard, to an application program running in an SMP system, all the individual processor memories look like a single memory. Each of the clusters is viewed by NUMA as a "node" in the interconnection network, maintaining a hierarchical view of the data on all the nodes.

NUMA systems are typically used for applications such as data mining and decision support system in which processing can be parceled out to a number of processors that collectively work on a common database, and thus are commonly employed in database server products and systems.

Figure 3B:
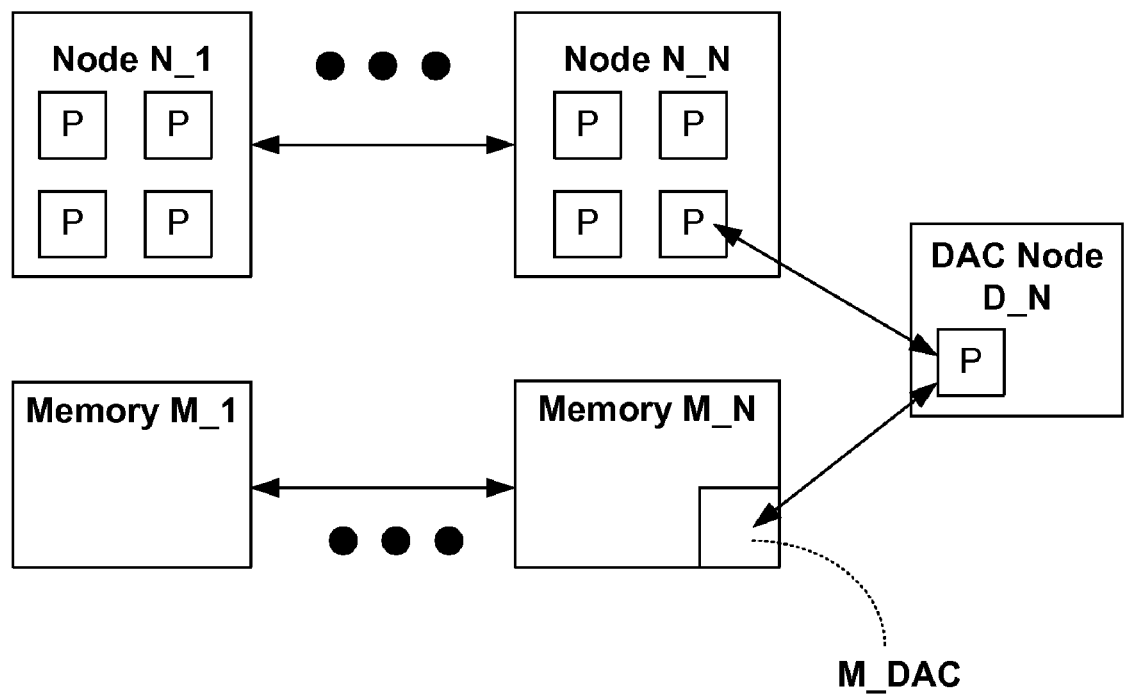
FIG. 3B is a block diagram illustrating exemplary implementation of the DAC in accordance with the invention in the context of a NUMA architecture.

Thus, in accordance with the invention, as illustrated in exemplary non-limiting detail in FIG. 3B, a database server may include a plurality of nodes N_1 to N_N with blocks P and with memory M_1 to M_N arranged accordingly. In accordance with the invention, a DAC Node D_N is provided having some pre-defined processing power and pre-defined memory M_DAC reserved in the overall system for a DAC node D_N, which uses the allocated resources to perform diagnostics on the other nodes N_1 to N_N. It should be noted that the invention is not limited to NUMA architectures, and that such NUMA description is provided merely for exemplary illustration of an embodiment of the invention. For instance, a DAC Node D_N is provided in accordance with the invention in non-NUMA implementations of the invention as well. For instance, in SMP architectures, a DAC node N_1 and an associated memory node M_1 are present, in addition to the DAC Node D_N.

Figure 4A:
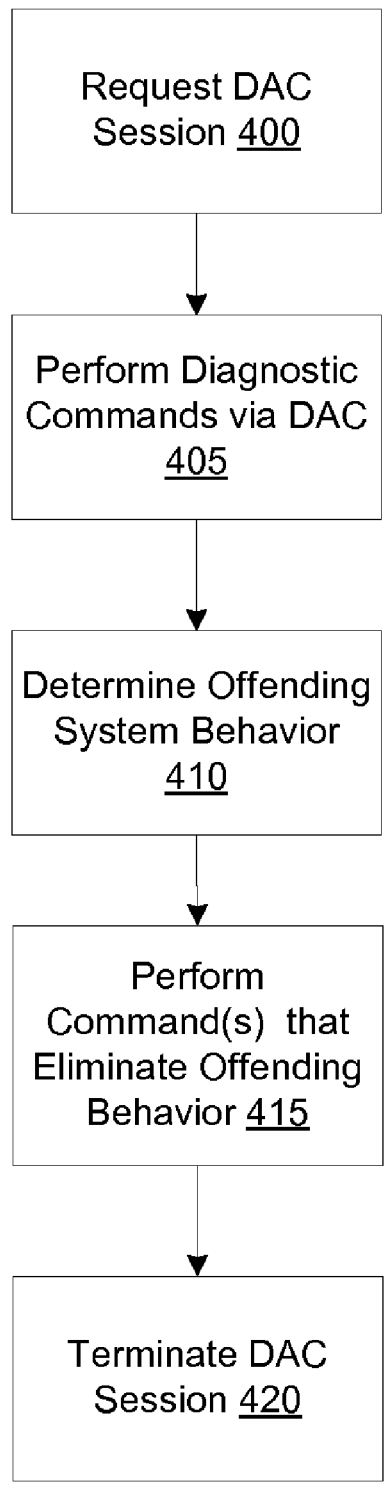
FIGS. 4A, 4B and 4C are exemplary non-limiting flow diagrams illustrating exemplary use of the DAC to restore server behavior to a properly functioning state in accordance with the present invention.

An exemplary scenario for the invention is illustrated in the flow diagram of FIG. 4A. Due to some problem that is apparent in the database server (or even if the problem is not apparent), at 400, a user with appropriate administrator privileges logs on and creates a DAC session over the DAC connection of the invention. At 405, once the DAC session is established, the user can perform a variety of diagnostic commands via DAC, e.g., via the appropriate command line functions or via other method of specifying diagnostic commands, such as via a graphical user interface or the like, where appropriate. Then, at 410, the diagnostic commands having returned results that are readily capable of interpretation by the user, the user determines the offending system behavior, or if the results meet some pre-defined characteristics associated with "ill behavior," such as if a particular SPID process has been ongoing for several days, then the system may identify the offending system behavior via the DAC. Once the problem is identified, at 415, the user performs command(s) that eliminate the offending behavior. For instance, if the page size for memory is set too small, the user can change the page size, or if a particular application has a process in deadlock, the user can eliminate the particular process, or kill the application. Moreover, if there is a problem with a privileged part of server memory, such as the system registry, the DAC node allows the user to make the appropriate changes without needing to restart the machine in "safe mode" or other proxy for making changes to privileged parts of memory. Optionally, the DAC session can then be terminated at 420 to ready the DAC for another session (since one session at a time is allowed). Thus, the user can fix a variety of database server problems via the DAC that previously would have required system restart, or other interruption of the operation of the database server.

As mentioned, the same techniques can be used at a debugging stage to observe the effects of ill-conceived code. If the code produces the same problem each time, which is observable via a DAC session, a programmer can witness a problem firsthand, and take corrective action in a next incarnation of the code.

Figure 4B:
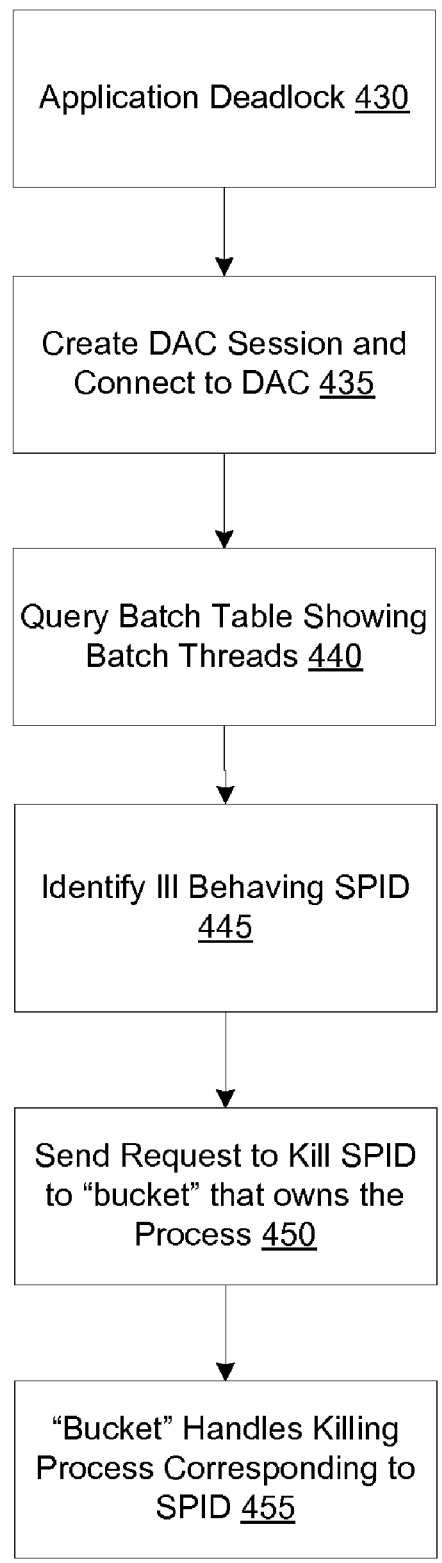

FIG. 4B is an exemplary flow diagram illustrating a sequence of undoing an application deadlock in accordance with the invention. At 430, or sometime before, an application deadlock occurs, i.e., one or more processes being executed by or initiated by the application have placed an unreasonable burden on the resources of the server. At 435, a user creates a DAC session and connects to the DAC. At 440, the batch table can be queried by the user showing the batch threads. At 445, the results of the query help the user identify the particular ill behaving SPID(s). The user then requests at 450 to kill the ill behaving SPID(s), and such request is automatically routed by the DAC node to the appropriate NUMA "bucket" that owns or is executing the ill behaving SPID(s). At 455, the bucket that owns the ill behaving SPID(s) handles the killing of the SPID(s) and the server is returned to operational order. The DAC session may then be terminated.

Figure 4C:
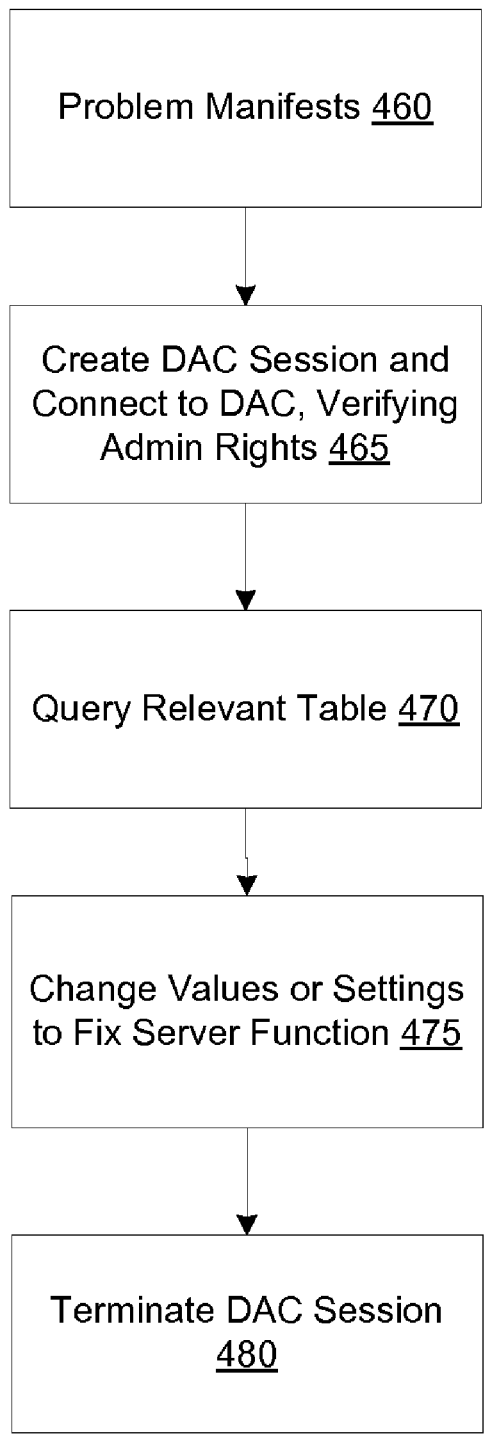

FIG. 4C illustrates another exemplary flow diagram illustrating a sequence wherein it is desirable to change a system configuration, system setting, virtual table, or privileged part of memory (some portions of memory are so privileged they cannot even be displayed), such as the system registry, while the database server is operating, i.e., without needing to terminate the operation of the database server. At 460, some problem manifests, e.g., system registry error, or page size too small, etc. At 465, a DAC session is created to connect to the DAC of the invention, while verifying the identity of the user as having administrator privileges/rights. At 470, the relevant table is queried for the information of interest, whether it be information from the system registry, from various configuration or setting tables, etc. At 475, the new values or settings are set to take effect in order to fix whatever problem manifested. At 480, the user may terminate the DAC session having effected the change. Advantageously, the DAC of the invention thus allows access to and the ability to change critical, high profile, internal metadata used by the database server during operation.

Since the DAC is to be used only to diagnose a server resolving some situations to bring the server back online, in one non-limiting embodiment or implementation of the invention, the following assumptions and/or restrictions can optionally be made with respect to a DAC in accordance with the invention:

(1) One "DAC" is allowed per server instance to ensure that resources are guaranteed for the DAC;

(2) The DBA can activate a DAC locally or from a remote machine. In one embodiment, the TCP/IP connection type is supported, though any predefined protocol could be used;

(3) A simple command line tool (e.g., sqlcmd) using a separate flag (e.g., -A) is provided to support this feature;

(4) The DAC automatically connects the end-user to the "master" database;

(5) The DAC supports encryption and other general security features used in the relevant server;

(6) The DAC includes a user login that is a member of the system administrator role;

(7) In SQL implementations, T-SQL statements are allowable when being executed using DAC connection, however, resource intensive queries consuming plenty of CPU cycles and allocating significant memory portions are generally avoided since the DAC connection is created primarily for troubleshooting/diagnostic purposes;

(8) A special thread is assigned to DAC allowing the execution of diagnostic functions or queries on a separate scheduler. Available memory resource allocation can be expected for simple diagnostic and troubleshooting queries; and (9) The DAC cannot be killed (only the DAC session, i.e., the client portion).

To enable a DAC in accordance with an embodiment of the invention, the database server exposes a special port through which the DBA or product support services (PSS) team can connect. In one embodiment, TCP/IP protocol is supported. At startup, the server registers a dynamic TCP/IP port to listen for admin connections. In a SQL embodiment, this port can be queried the same way the multiple instance ports are queried using SQL Server Resolution Protocol (SSRP). In one embodiment, when connecting to this special port, the user prefixes the servername portion of the string with "admin:". The client recognizes this as an admin connection and uses SSRP to figure out the port to which to connect. In one non-limiting embodiment, the sqlcmd command is used with an admin flag (e.g., -A) that automatically appends the string ("admin:") when connecting to the server.

In order to allow only one session to be active on the DAC port, once a connection is accepted, no more DAC connections are allowed. Any new DAC connection returns an error message as long as there is already an active open admin connection.

As mentioned, DAC is executed on a dedicated thread running on a separate scheduler reserved by server operating system layer. In one embodiment, a 1.5 MB thread stack size and 1 MB memory are reserved up front for the DAC as a minimum memory requirement.

In an exemplary, non-limiting SQL embodiment, the DAC session is indicated in the endpoint_id column of sysprocesses, indicating the DAC connection as "−1," "DAC," "Supportability," or other suitable name. When a user connects to the admin port, the language processing and execution (LPE) component authenticates the user to ensure that the user belongs to the SQL Server sysadmin role. Also, in one embodiment, LPE validates the DAC session and ensures that objects created during the DAC session are not cached for security reasons. Furthermore, the following properties are set on the user session so that queries are not blocked when run:

(1) Lock Timeout is recommended to the user as something that can be overridden, or Lock Timeout could be set per default to infinite (can also be reconfigured using SET LOCK TIME command); and (2) Any objects that can be cached should not be cached when created by this session.

In one embodiment of the invention, DAC Encryption is supported the same way as for normal connections. If the admin (client) requests that the connection be encrypted, then the server will encrypt it. If the server is set to accept encrypted connections only, then the connection will have to be encrypted.

In an exemplary, non-limiting SQL Server embodiment, although all T-SQL statements are allowable using DAC, it is recommended that the DAC feature restricts T-SQL statements to following diagnostic/troubleshooting/admin commands: (A) SELECT from the following tables: sysprocesses, syslockinfo, syscacheobjects and sysdatabases; (B) SP_WHO; (C) SP_LOCKS, (D) SET LOCK_TIMEOUT, (E) KILL, (F) DBCC and (G) SHUTDOWN. Other operations executed on DAC should be used with caution since they may block the "ill responded" server (or the connection) in a similar way that has blocked the main connection necessitating use of the DAC. In one embodiment, with respect to KILL, DAC allows commands that kill only user threads (i.e., greater than SPID 50). With respect to the DBCC command, it is recommend that the basic DBCC commands are used and that none of defrag, rebuild the index, or check the entire database is used. Such recommendations can be enforced or merely encouraged behavior.

With respect to DAC extensions, a DAC registry containing a static and a dynamic port was implemented in one embodiment allowing client-server connection with the DAC node. In one embodiment, the DAC registry has the following properties:

(1) The DAC registry is created by SETUP during server software installation;

(2) The DAC port is dynamic, assigned dynamically by the Server during startup;

(3) Changing TCPPort=0: to another value (for example; port 8080) forces the DAC node to use a static port. However, changes made by the end-user to the default setting of the DAC registry are not recommended;

(4) The DAC port is defined for the duration of Server life time (from startup to shutdown) and cannot be changed during this time. The DAC registry may not be deleted. In case the DAC registry is removed before Server startup, the DAC node is prevented from being initiated. Optionally, a warning may be written to the error log during Server startup to inform the DBA that the DAC is not running; and (5) Once started, the DAC node runs permanently and cannot be disabled, although the DAC session (client side connection) can be killed, at which point another DAC session can be created.

In one non-limiting SQL embodiment, it was determined that the basic memory requirements for DAC is 0.5 MB for each of three (3) DAC threads (1.5 Mb total including a 0.5 MB stack as part of the thread(s)) and 1 MB for query processing. As mentioned, this memory is reserved up front during server startup, and such particular memory choices should be considered non-limiting implementation details.

The following example illustrates an exemplary use of a DAC in accordance with the invention by a DBA:

(1) A DBA activates a command line tool to connect to a server "URAN123" using DAC, e.g., by entering "sqlcmd -SURAN123 -Usa -Pxxx -A".

(2) Running a typical diagnostic query, the DBA enters "select * from sysprocesses".

(3) Exemplary results might be generated as follows:

| spid | endpoint_id |
|------|-------------|
| ... |  |
| 60 | 1 |
| 70 | −1 (the DAC session) |

(4) Supposing in the example that SPID 60 is causing the problem on the server side, the DBA may enter "kill 60", a command that thus kills the thread that is causing the server problem.

(5) Then, if the DAC is no longer needed because the server is fully functional again, the DBA can exit "sqlcmd" to terminate the DAC session.

Graphical user interface techniques may be equally useful assuming the requisite client capabilities for interaction with the server via DAC.

In various embodiments, the DAC of the invention exposes certain security threats that may be handled as follows. With respect to password encryption, the password delivered with <sqlcmd> is not encrypted when transferred from the client to the server unless the client/server is explicitly setup for encryption, which forces the entire communication between client and server being encrypted. Since a non-encrypted password represents a serious security threat in the client-server communication, an option is provided to encrypt the password for all system administrator (SA) connections. In this regard, the SA password encryption is not related only to <sqlcmd>, but represents a general security issue for all SA connections.

With respect to overloading DAC connection with false connect requests, an attacker can execute in a loop running a false DAC connection from client(s) that may overload the DAC port. Although none of these connections will succeed, the specific attack method will prevent the "real" administrator from accessing the server (denial of service). This is a general connectivity issue in all client-server connections, and thus in one embodiment, the same mechanism used by the standard network interface (SNI) to prevent false connect requests is used for DAC connections too.

With respect to connection timeout, since DAC allows only one user to be connected at a given time, the connection timeout for DAC is implemented to disallow long, unattended or abundant sessions. In one embodiment, a default timeout is selected, which is optionally configurable.

With respect to forcing termination of a DAC session, as mentioned, a DAC session can be terminated using the <kill> command, though only a member with administrative privileges is authorized to kill the session.

With respect to preventing the overload of a server with new connections in case a current DAC session is in progress, the special DAC port is closed and all requested DAC connections are rejected if a DAC session is in progress. In one embodiment, a notification may be transmitted to the requesting client informing the client that the specific port is in use. In an alternate embodiment, it is assured that no messages are sent when a DAC connection is used, so the user is uninformed as to the opening and closing of the port.

With respect to unlimited user access to the system tables, sysprocesses can be locked in exclusive mode using a TABLOCKX command. This is a general threat (denial of service), and thus, in one non-limiting SQL embodiment, it is disallowed for any system table.

In order to increase the level of reliability and responsibility, in one embodiment, the DAC of the invention executes on a separate (hidden) node with its own input/output (I/O) completion port and memory pool.

In order to further increase the security level, in one embodiment, the DAC connection of the invention cannot be cascaded. When accessing a linked server via a DAC session, the connection to any remote database will not have the DAC-privileges, but rather will be considered as a regular session.

In order to still further increase security, the DAC connection and its threads are run at a higher deadlock priority, and DAC cannot be picked as a kill target unless there is no other way to resolve the deadlock.

There are multiple ways of implementing the present invention, e.g., an appropriate API, tool kit, driver code, operating system, control, standalone or downloadable software object, etc. which enables an administrator or programmer to access the DAC of the invention. The invention contemplates the use of the invention from the standpoint of an API (or other software object), as well as from a software or hardware object that receives or sends data over the DAC in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to recover from failure without restarting the machine or in which it is desirable to monitor the operation of code on the computing device. For instance, the algorithm(s) and implementations of the invention for accessing and using the DAC of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the DAC of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to enable the DAC of the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for connecting to a database server, comprising:
    creating a diagnostic session via a connection to the database server, said connection being dedicated to diagnostic functions including logging on to said connection only by users having administrator privileges on the database server, whereby a special thread is assigned to said connection allowing for execution of diagnostic functions or queries on a separate scheduler;
    initiating over said connection at least one diagnostic function on the database server and receiving the results of the at least one diagnostic function indicating at least one problem with operation of the database server; and
    correcting the at least one problem by issuing at least one corrective command to the database server over said connection without restarting the database server,
    wherein said initiating at least one diagnostic function includes initiating a query of a batch table of the database server and said results indicate information about system process identifiers executing on the database server, and
    wherein said correcting includes terminating at least one process corresponding to an ill behaving system process identifier.

2. A method according to claim 1, wherein said logging includes encrypting a user's credentials when transferring the credentials over the connection.

3. A method according to claim 1, wherein said creating includes creating only one diagnostic session over said connection at one time.

4. A method according to claim 1, wherein said terminating includes forwarding by a node that handles processing for said connection a request to terminate the at least one process corresponding to the ill behaving system process identifier to the node that includes at least one thread corresponding to the ill behaving system process identifier.

5. A method according to claim 1, wherein said initiating at least one diagnostic function includes initiating a query of a privileged table of the database server that cannot be accessed by a user without administrator privileges of the database server and said correcting includes changing information associated with the privileged table without restarting the database server.

6. An application programming interface comprising computer executable interface modules to a database server stored in a computer readable storage medium for performing the method of claim 1.

7. A computing device for performing the method of claim 1.

8. A method for initializing a database server at startup, including:
    reserving a subset of processing, memory and system resources for a diagnostic node for performing diagnostic functions on the database server, whereby functionality of said diagnostic node can only be invoked via a dedicated connection to the database server accessed only by users having administrator privileges on the database server,
    wherein the dedicated connection allows for a diagnostic session to be established, said dedicated session including a special thread assigned to the dedicated connection allowing for execution of diagnostic functions or queries on a separate scheduler, and
    wherein said functionality of said diagnostic node includes changing a privileged table inaccessible to any user except administrator users via the dedicated connection.

9. A method according to claim 8, wherein only one user can access the dedicated connection at a single time.

10. A method according to claim 8, wherein said functionality of said diagnostic node includes terminating ill behaving system process identifiers in the database server.

11. A computer readable storage medium comprising computer executable interface modules to a database server for performing the method of claim 8.

12. A database server, including:
a plurality of nodes and corresponding memory units for performing processing of ordinary operations of applications, database commands and services by the database server; and
a diagnostic node for performing diagnostic functions on the database server, whereby a subset of processing, memory and system resources are reserved for dedicated use by the diagnostic node, whereby functionality of said diagnostic node can only be invoked externally via a dedicated connection to the database server accessed only by users having administrator privileges on the database server, whereby a special thread is assigned to the dedicated connection allowing for execution of diagnostic functions or queries on a separate scheduler, the dedicated connection including a registry including a static and a dynamic port.

13. A database server according to claim 12, wherein only one session can take place on the dedicated connection at one time.

14. A database server according to claim 12, wherein said diagnostic node is used to terminate at least one ill behaving system process identifier in the database server without having to restart the database server.

15. A database server according to claim 14, wherein the diagnostic node determines in which of the plurality of nodes the at least one ill behaving system process identifier is executing, and forwards a request to terminate the at least one ill behaving system process identifier to the determined node to handle termination of the at least one ill behaving system process identifier.

16. A database server according to claim 12, wherein said diagnostic node is used to change a privileged table ordinarily inaccessible to any user except administrator users via the dedicated connection.

* * * * *